United States Patent
Martchovsky

(10) Patent No.: US 11,075,548 B2
(45) Date of Patent: Jul. 27, 2021

(54) RECONFIGURABLE POWER IN A WIRELESS POWER TRANSFER SYSTEM

(71) Applicant: Integrated Device Technology, Inc., San Jose, CA (US)

(72) Inventor: Detelin Borislavov Martchovsky, Fremont, CA (US)

(73) Assignee: Integrated Device Technology, Inc., San Jose, CA (US)

(*) Notice: Subject to any disclaimer, the term of this patent is extended or adjusted under 35 U.S.C. 154(b) by 85 days.

(21) Appl. No.: 16/365,310

(22) Filed: Mar. 26, 2019

(65) Prior Publication Data

US 2020/0227952 A1     Jul. 16, 2020

Related U.S. Application Data

(60) Provisional application No. 62/793,348, filed on Jan. 16, 2019.

(51) Int. Cl.
| | |
|---|---|
| *H02J 7/00* | (2006.01) |
| *H02J 50/80* | (2016.01) |
| *H02J 50/10* | (2016.01) |
| *H02J 7/02* | (2016.01) |

(52) U.S. Cl.
CPC .............. *H02J 50/80* (2016.02); *H02J 50/10* (2016.02); *H02J 7/025* (2013.01)

(58) Field of Classification Search
CPC .............. H02J 50/80; H02J 50/10; H02J 7/025

USPC ........................................................ 307/104
See application file for complete search history.

(56) References Cited

U.S. PATENT DOCUMENTS

| | | | |
|---|---|---|---|
| 9,124,309 B2* | 9/2015 | Jung ................. | H02J 50/80 |
| 2019/0296591 A1* | 9/2019 | Park ................. | H02J 50/80 |
| 2020/0343765 A1* | 10/2020 | Kwon ................ | H02J 7/02 |
| 2020/0366137 A1* | 11/2020 | Park ................. | H02J 50/60 |

\* cited by examiner

*Primary Examiner* — Ryan Jager
(74) *Attorney, Agent, or Firm* — Haynes and Boone, LLP

(57) ABSTRACT

Embodiments described herein provide a method for wireless power transmission of reconfigurable power levels. A wireless power receiver is used to receive power from a wireless power transmitter according to a negotiated power level. The wireless power receiver determines whether a re-negotiation condition is met at the wireless power receiver. The wireless power receiver then sends, to the wireless power transmitter, a re-negotiation request for an updated power level different from the negotiated power level. The wireless power receiver receives, from the wireless power transmitter, an acknowledgement that acknowledges the updated power level, and then operates to receive power from the wireless power transmitter according to the updated power level.

10 Claims, 3 Drawing Sheets

RECONFIGURABLE POWER IN A WIRELESS POWER TRANSFER SYSTEM

CROSS-REFERENCE

This application claims the benefit, under 35 U.S.C. § 119(e), and commonly-owned U.S. provisional application No. 62/793,348, filed on Jan. 16, 2019, which is hereby expressly incorporated herein by reference.

TECHNICAL FIELD

Embodiments of the present invention are related to wireless transmission of power and, in particular, to a reconfigurable power supply mechanism at a wireless power transfer system.

DISCUSSION OF RELATED ART

Mobile devices, for example smart phones, tablets, wearables and other devices are increasingly using wireless power charging systems. In general, wireless power transfer involves a transmitter driving a transmitter coil and a receiver with a receiver coil placed proximate to the transmitter coil. The receiver coil receives the wireless power generated by the transmitter coil and uses that received power to drive a load, for example to provide power to a battery charger.

Typically, a wireless power system includes a transmitter coil that is driven to produce a time-varying magnetic field and a receiver coil, which can be part of a device such as a cell phone, PDA, computer, or other device, that is positioned relative to the transmitter coil to receive the power transmitted in the time-varying magnetic field. Conventionally, the received power at the wireless receiver is predetermined by circuit design and remains unchanged during operation of the wireless power system. Any modification of the received power level requires time and labor to change the circuit configuration at the wireless receiver.

Therefore, there is a need to develop a mechanism for a wireless power system with flexible power transfer levels.

SUMMARY

In view of the wireless transfer power level issues, embodiments described herein provide a method for wireless power transmission of reconfigurable power levels. A wireless power receiver is used to receive power from a wireless power transmitter according to a negotiated power level. The wireless power receiver determines whether a re-negotiation condition is met at the wireless power receiver. The wireless power receiver then sends, to the wireless power transmitter, a re-negotiation request for an updated power level different from the negotiated power level. The wireless power receiver receives, from the wireless power transmitter, an acknowledgement that acknowledges the updated power level, and then operates to receive power from the wireless power transmitter according to the updated power level.

Embodiments described herein also provide a method for wireless power transmission of reconfigurable power level. The wireless power transmitter receives from a wireless power receiver, a negotiation request for a power level. The wireless power transmitter monitors a maximum available power level and a currently available power level no greater than the maximum available power level, based at least in part on a current environment of the wireless power transmitter. The wireless power transmitter acknowledges the negotiation request when the requester power level is lower than the currently available power level. The wireless power transmitter declines the negotiation request when the requester power level exceeds the maximum available power level. The wireless power transmitter configures an input power source to support the requested power level when the requester power level is between the currently available power level and the maximum available power level.

These and other embodiments are discussed below with respect to the following figures.

BRIEF DESCRIPTION OF THE FIGURES

FIG. 1 illustrates an example wireless power transmission system with reconfigurable power transfer levels, according to some embodiments.

FIG. 2 illustrates an example logic flow for reconfigurable power negotiation at a receiver, according to some embodiments described herein.

FIG. 3 illustrates an example logic flow or reconfigurable power negotiation at a transmitter, according to some embodiments described herein.

These figures are further discussed below.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description illustrates inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

FIG. 1 illustrates an example wireless power transmission system 100 with reconfigurable power transfer levels, according to some embodiments. As illustrated in FIG. 1, a power transmitter TX 102 is coupled to drive a transmitter coil 106 to produce a time varying magnetic field. The time varying magnetic field induces a current in receiver coil 108. Receiver coil 108 is coupled to power receiver RX 104, which receives the transmitted wireless power. RX 104 is coupled to a load 114, for example, a battery charger, which is configured to charge a battery with the received power.

As is further illustrated in FIG. 1, TX 102 and RX 104 communicate through a communications channel 110, via their respective communication interfaces 113 and 115. Channel 110 can be any wireless communications channel, including the back-channel available through modulation of the transmitted wireless power itself. Through channel 110, RX 104 may request power transmission changes from TX 102, for example, a different power level. Further, TX 102 is coupled to a power supply 112 that provides power to drive TX 102. In some embodiments, the power supply 112 may provide adjustable power levels. In some embodiments, Tx 102 includes a circuit that adjusts the input voltage from the power supply 112 to configure an input power level.

Figure 1:
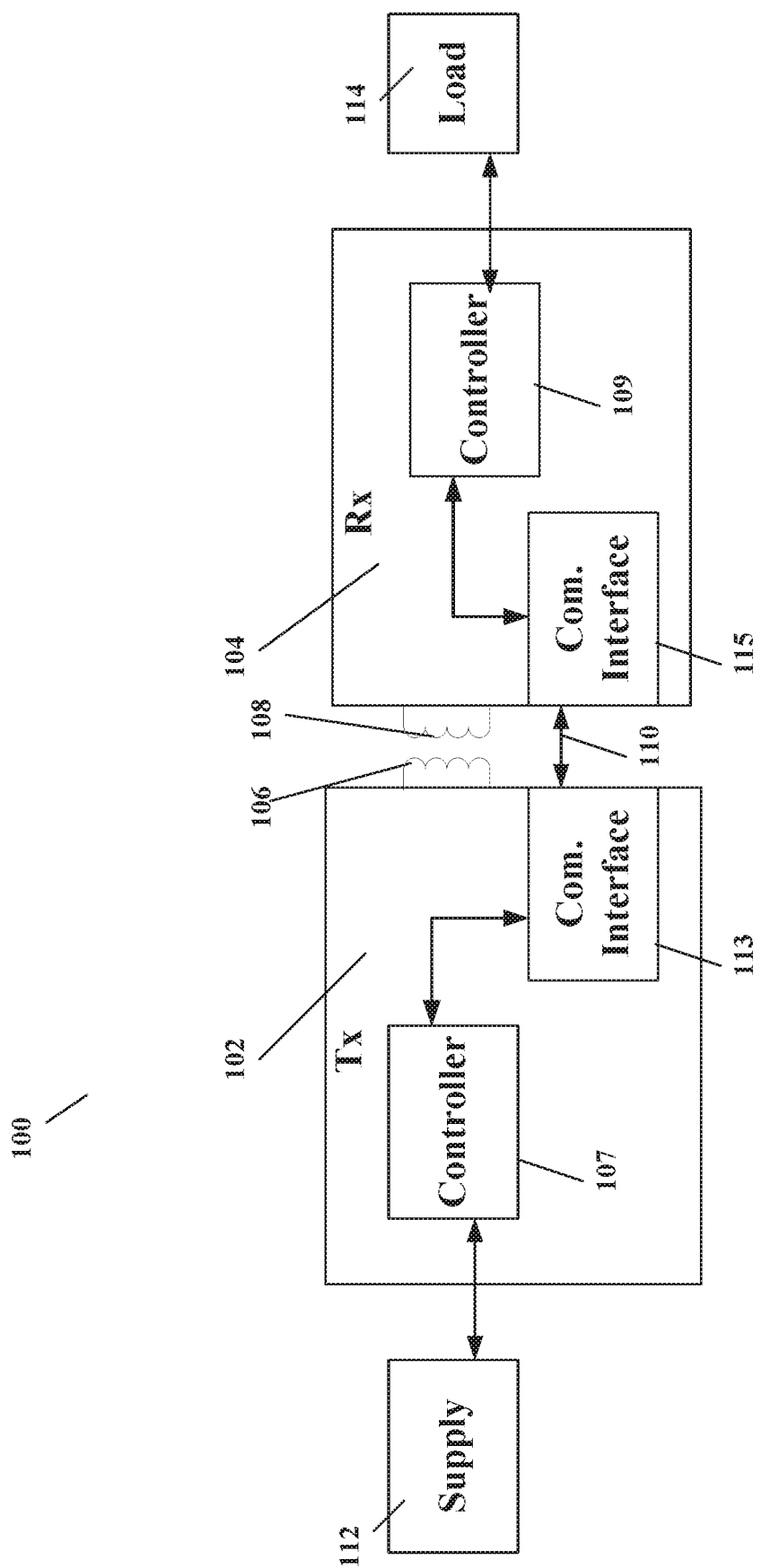

Various power levels may be used for a wireless power system 100 for transmitting reconfigurable power levels from Tx 102 to Rx 104. As used herein, the potential power (PP) is defined as the highest power TX 102 is designed to provide at the best conditions and configurations. The PP value is used as a reference during the certification process. For example, TX 102 can be issued a certificate that it meets the Wireless Power Consortium (WPC) specification up to the level of PP.

As used herein, the maximum available power (MAP) is defined as the maximum power that TX 102 can deliver in the current environment using its best configuration (if configuration is available), for example, when supply 112 is tuned to provide the maximum input voltage. The MAP is usually no higher than the PP. The MAP can be temporarily reduced due to an over-temperature condition at Tx 102, which impairs the performance of Tx 102. MAP can also be limited by the power supply 112 currently in use. RX 104 may request a power contract from TX 102 up to the MAP level.

As used herein, the available power (AP) is defined as the maximum power the TX 102 can deliver at the current condition. Usually AP equals MAP, but if the TX 102 power supply supports configuration of different input voltage levels, AP may be different (lower) than MAP, for example, when power supply 112 is not tuned to the maximum.

As used herein, the requested power (RP) is defined as the power level the RX 104 tries to negotiate with Tx 102. The RP is limited by MAP, for example, consequently, Rx 104 should negotiate RP that is lower than MAP when knowledge of MAP is available to Rx 104. If the RP is acknowledged by Tx 102, the RP is also referred to as the negotiated power (NP).

Rx 104 and Tx 102 each include a controller 107 and 109, respectively. Controller 107 is coupled to the power supply 112 to adjust an input power level from the power supply 112. Controller 109 is coupled to the load 114, e.g., to control a charging application. The controllers 107 and 109 are coupled to the communication interfaces 113 and 115, respectively, to control message passing between Rx 104 and Tx 102. For example, the controller 109 may initiate a negotiation request for RP and send the negotiation request via communication interface 115 to Tx 102. For another example, the controller 107 may obtain information of MAP or AP and send indications of MAP or AP to Rx 104 via communication interface 113. Further implementations of the power negotiation mechanism between Tx 102 and Rx 104 are discussed in relation to FIGS. 2-3.

Figure 2:
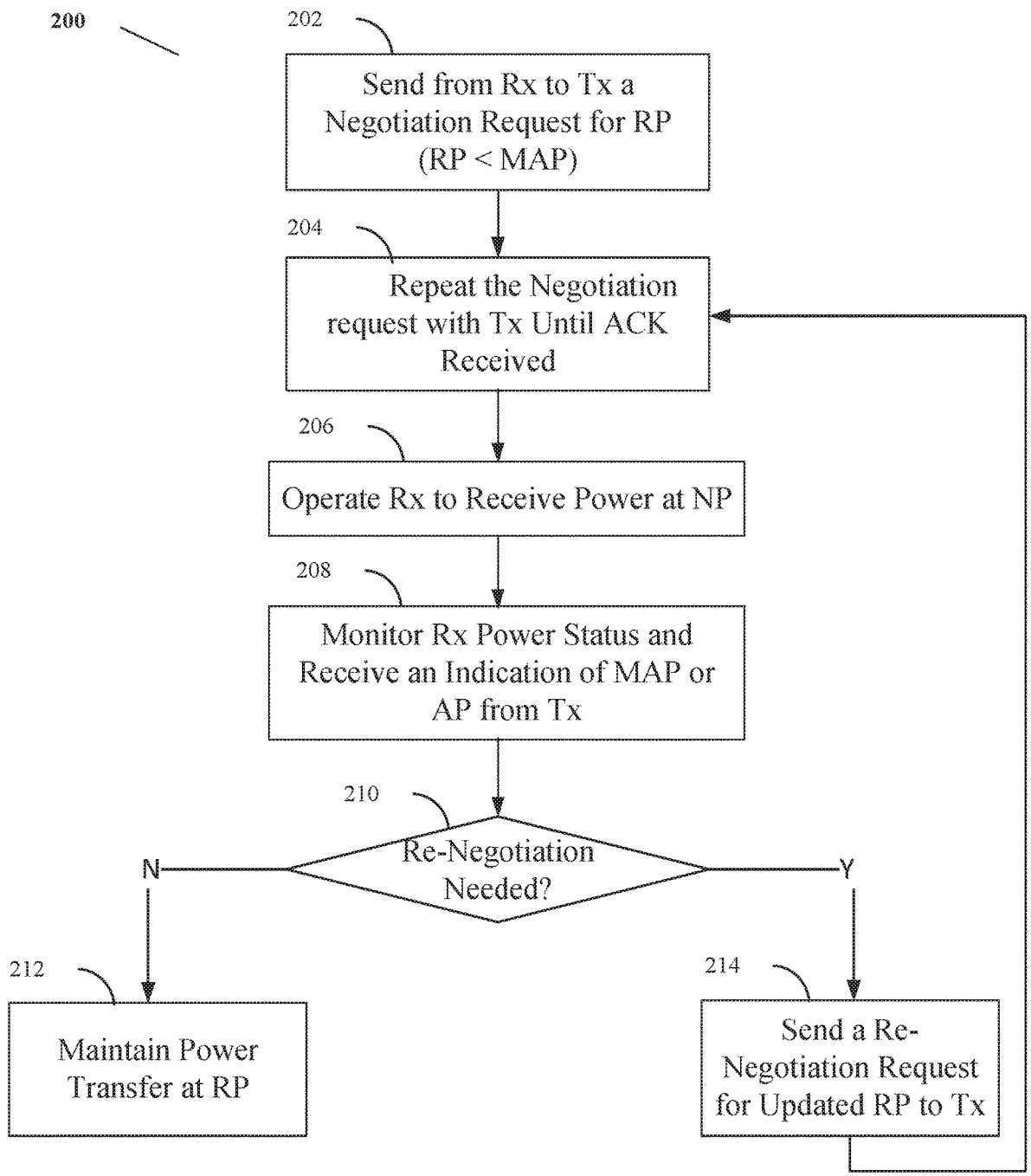

FIG. 2 illustrates an example logic flow 200 for reconfigurable power negotiation at Rx 104, according to some embodiments described herein. At step 202, a negotiation request is sent from Rx 104 to Tx 102, that requests for a RP, which is usually no greater than the MAP. For example, Rx 104 may periodically, intermittently or constantly receive indications from Tx 102, via communication interfaces 113 and 115, of current MAP or AP at Tx 102. Rx 104 in turn configures the RP in a negotiation request to be no greater than the current MAP.

At step 204, when the RP in the negotiation request is no greater than the MAP, Rx 104 may repeat the request with Tx 102 until an acknowledgement is received from Tx 102. At step 206, Rx 104 may then operate to receive power (through receiver coil 108) at the NP.

At step 208, Rx 104 monitors the Rx power consumption status and receives updated indications of MAP or AP from Tx 102. At step 210, Rx 104 determines whether a re-negotiation condition is met. For example, Rx 104 is usually required to maintain the power consumption under the NP, and Rx 104 may determine whether a higher power level is required than the current NP. When Rx 104 determines that a higher power level is needed, Rx 104 may send a re-negotiate request with updated RP, at step 214. The updated RP again is no greater than the MAP. For another example, Rx 104 may receive an updated MAP from Tx 102 and determine whether the current NP is still below the updated MAP. When MAP drops below the current NP, Rx 104 may send a re-negotiation request as soon as possible, at step 214, for a new power contract with updated RP that meets the new limit of MAP. For another example, Rx 104 may also monitor power consumption at the Rx device, and determine whether the power consumption is reduced below a threshold level, for example, when Rx 104 is operated on a low power mode. When the power consumption is reduced below the threshold, the Rx 104 also re-negotiates a suitable lower power level contract in case of reduced power demand. If none of the re-negotiation conditions occurs, Rx 104 maintains the power transfer level at NP at step 212.

Figure 3:
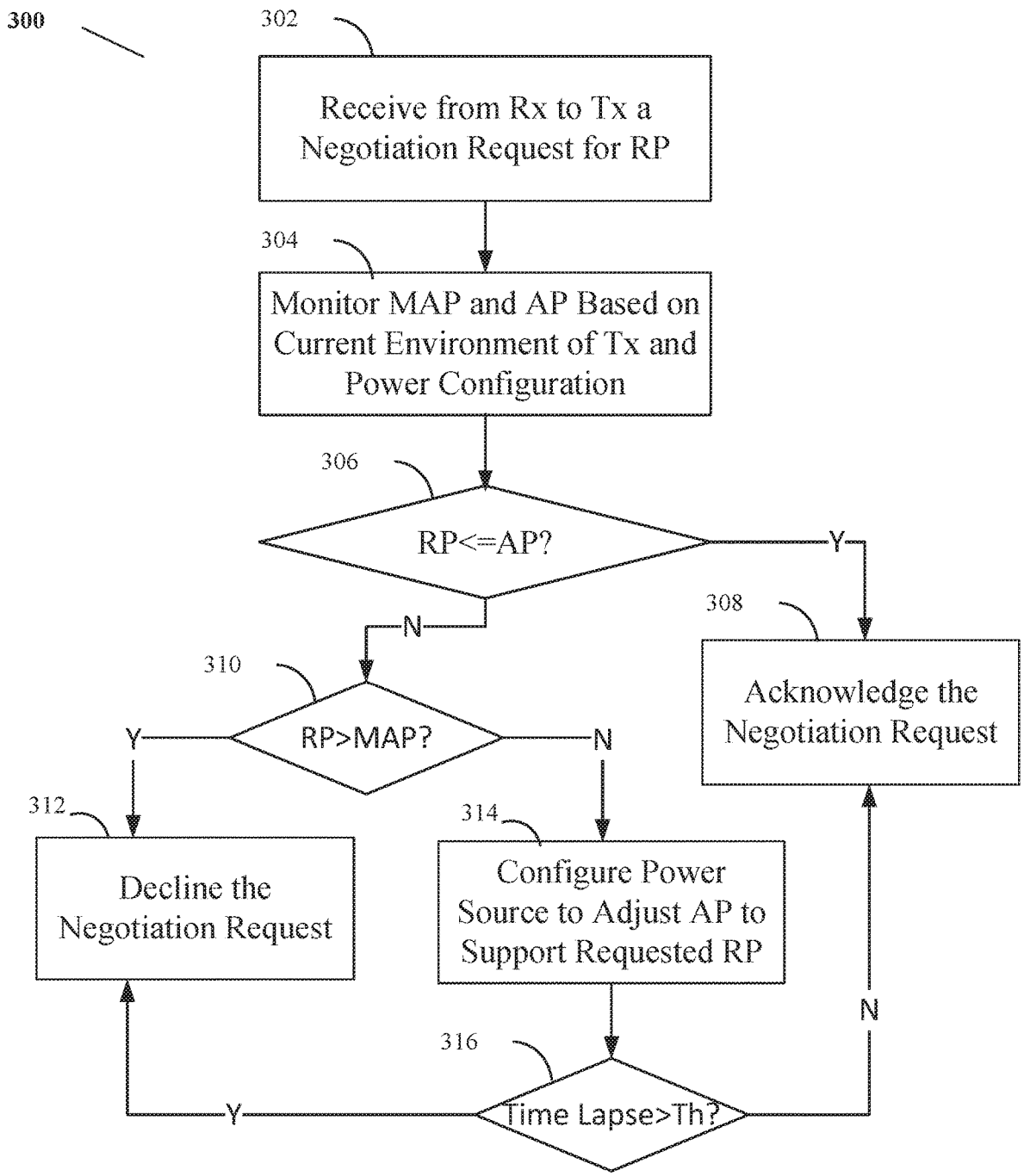

FIG. 3 illustrates an example logic flow 300 for reconfigurable power negotiation at Tx 102, according to some embodiments described herein. At step 302, Tx 102 receives from Rx 104 a negotiation request for a power level at RP. At step 304, Tx 102 monitors the current MAP and AP based on the current environment of Tx 102 and the power configuration. For example, the MAP may be impacted by the environment (e.g., temperature, humidity, etc.) of Tx 102. For another example, depending on power supply 112 configuration, AP may be lower than MAP.

At step 306, Tx 102 determines whether RP is no greater than the current AP. At step 308, when RP is no greater than the current AP, Tx 102 acknowledges the negotiation request, for example, by sending an acknowledgment to Rx 104. Once Tx 102 acknowledges the RP as NP, Tx 102 is configured to maintain the power transfer level at the NP as long as the current MAP is greater than NP.

Alternatively, when RP is greater than the current AP, at step 310, Tx 102 further determines whether the RP is greater than the current MAP. At step 312, when the RP is greater than the current MAP, Tx 102 declines the negotiation request. At step 314, when the RP is no greater than the current MAP, i.e., AP<RP≤MAP, Tx 102 configures the power supply 112, for example, to increase the AP to support the RP.

At step 316, Tx 120 determines whether a time lapse is greater than a threshold while the power supply 112 is being configured to boost the AP. If the time lapse is too long (e.g., greater than the threshold) before the power configuration is not completed, process 300 proceeds to step 312, at which the negotiation request is declined. In this case, Rx 104 may resend the negotiation request for the same RP (at step 204) because the RP is lower than MAP. If the time lapse has not reached the threshold when power configuration is completed, process 300 proceeds to step 308, at which the negotiation request is acknowledged.

In some embodiments, TX 102 may adjust the AP level, e.g., by configuring the power supply 112, to improve the system efficiency, while still meeting the NP requirement, e.g., the adjusted AP is still sufficient to support the NP.

The various steps of process 200, which are implemented at Rx 104, and the various steps of process 300, which are implemented at Tx 102, may be implemented separately, concurrently, sequentially or intermittently. For example, after step 202 in process 200 is implemented at Rx 104, process 300 can be implemented at Tx 102. For another example, when step 304 is implemented at Tx 102, step 208 of process 200 may be implemented concurrently.

The above detailed description is provided to illustrate specific embodiments of the present invention and is not intended to be limiting. Numerous variations and modifications within the scope of the present invention are possible. The present invention is set forth in the following claims.

What is claimed is:

1. A method for wireless power transmission of reconfigurable power levels, comprising:
   operating a wireless power receiver to receive power from a wireless power transmitter according to a negotiated power level;
   determining whether a re-negotiation condition is met at the wireless power receiver by determining whether the wireless power receiver requires a higher power level for operation than the negotiated power level;
   when the wireless power receiver requires the higher power level for operation than the negotiated power level, sending the re-negotiation request for the updated power level that reflects the higher power level;
   sending, to the wireless power transmitter, a re-negotiation request for an updated power level different from the negotiated power level;
   receiving, from the wireless power transmitter, a response; and
   when the response includes an acknowledgement that acknowledges the updated power level,
   operating the wireless power receiver to receive power from the wireless power transmitter according to the updated power level.

2. The method of claim 1, further comprising:
   receiving, from the wireless power transmitter, an indication of a maximum available power level or a currently available power level determined based on a current condition of the wireless power transmitter.

3. The method of claim 2, further comprising:
   sending, from a wireless power receiver to a wireless power transmitter, a negotiation request for a power level that is less than the maximum available power level; and
   repeating the negotiation request with the wireless power transmitter until an acknowledgement is received from the wireless power transmitter; re-negotiation request for the updated power level that reflects the higher power level.

4. The method of claim 1, wherein the determining whether the re-negotiation condition is met at the wireless power receiver comprises:
   monitoring a maximum available power level received from the wireless power transmitter;
   determining whether a current maximum available power level is lower than the negotiated power level; and
   wherein the method further comprises:
   sending the re-negotiation request for the updated power level that is bounded by the current maximum available power level.

5. The method of claim 1, wherein the determining whether the re-negotiation condition is met at the wireless power receiver comprises:
   determining whether a power demand at the wireless power receiver reduces below a threshold level;
   wherein the method further comprises:
   when the power demand at the wireless power receiver reduces below the threshold level, sending the re-negotiation request for a reduced power level.

6. A device for wireless power transmission of reconfigurable power levels, comprising:
   a receiver coil configured to receive power from a wireless power transmitter according to a negotiated power level;
   a controller configured to:
      determine whether a re-negotiation condition is met at the wireless power receiver by determining whether the wireless power receiver requires a higher power level for operation than the negotiated power level;
      when the wireless power receiver requires the higher power level for operation than the negotiated power level, sending the re-negotiation request for the updated power level that reflects the higher power level;
   a communication interface configured to:
      send, to the wireless power transmitter, a re-negotiation request for an updated power level different from the negotiated power level;
      receive, from the wireless power transmitter, a response in response to the re-negotiation request; and
   wherein the receiver coil is configured to receive power from the wireless power transmitter according to the updated power level when the response includes an acknowledgement that acknowledges the updated power level.

7. The device of claim 6, wherein the communication interface is further configured to:
   receive, from the wireless power transmitter, an indication of a maximum available power level or a currently available power level determined based on a current condition of the wireless power transmitter.

8. The device of claim 6, wherein the communication interface is further configured to:
   send, from a wireless power receiver to a wireless power transmitter, a negotiation request for a power level that is less than the maximum available power level; and
   repeat the negotiation request with the wireless power transmitter until an acknowledgement is received from the wireless power transmitter.

9. The device of claim 1, wherein the controller is further configured to determine whether the re-negotiation condition is met at the wireless power receiver comprises by:
   monitoring a maximum available power level received from the wireless power transmitter;
   determining whether a current maximum available power level is lower than the negotiated power level; and
   wherein the communication interface is further configured to:
   send the re-negotiation request for the updated power level that is bounded by the current maximum available power level.

10. The device of claim 6, wherein the controller is further configured to determine whether the re-negotiation condition is met at the wireless power receiver comprises by:
   determining whether a power demand at the wireless power receiver reduces below a threshold level;
   wherein the communication interface is further configured to:
   when the power demand at the wireless power receiver reduces below the threshold level, send the re-negotiation request for a reduced power level.

* * * * *